United States Patent [19]
Bureau

[11] Patent Number: 5,447,241
[45] Date of Patent: Sep. 5, 1995

[54] BICYCLE SUPPORTING STRUCTURE

[76] Inventor: Guy Bureau, 251 Reynolds, Montreal, Quebec, Canada, J2G 5V9

[21] Appl. No.: 129,308

[22] Filed: Sep. 30, 1993

[51] Int. Cl.⁶ .................................................. A47F 7/00
[52] U.S. Cl. ............................................ 211/18; 211/5
[58] Field of Search ............................ 211/18, 5, 4, 17

[56]                References Cited
           U.S. PATENT DOCUMENTS

| 610,656 | 9/1898 | Martin | 211/18 |
| 2,329,088 | 9/1943 | Schran et al. | |
| 3,934,436 | 1/1976 | Candlin et al. | 211/5 X |

FOREIGN PATENT DOCUMENTS

| 213699 | 6/1941 | Switzerland | 211/18 |
| 285977 | 1/1953 | Switzerland | 211/18 |
| 20461 | of 1897 | United Kingdom | 211/18 |

Primary Examiner—Ramon O. Ramirez
Assistant Examiner—Sarah L. Purol

[57] ABSTRACT

A supporting structure for supporting a bicycle by grasping onto a bar such as the handlebar of the bicycle or its cross bar so as to apply minimal stress to the spokes of the wheel. The structure comprises a base adapted to be secured to a wall surface, a sleeve pivotally connected to said base, a shaft slidably engaged in the sleeve and adapted to translate between a retracted position and an extracted position while also being able to rotate about its longitudinal axis, a gripping means fixed to a free end of the shaft means for gripping onto the bicycle and supporting the latter.

7 Claims, 11 Drawing Sheets

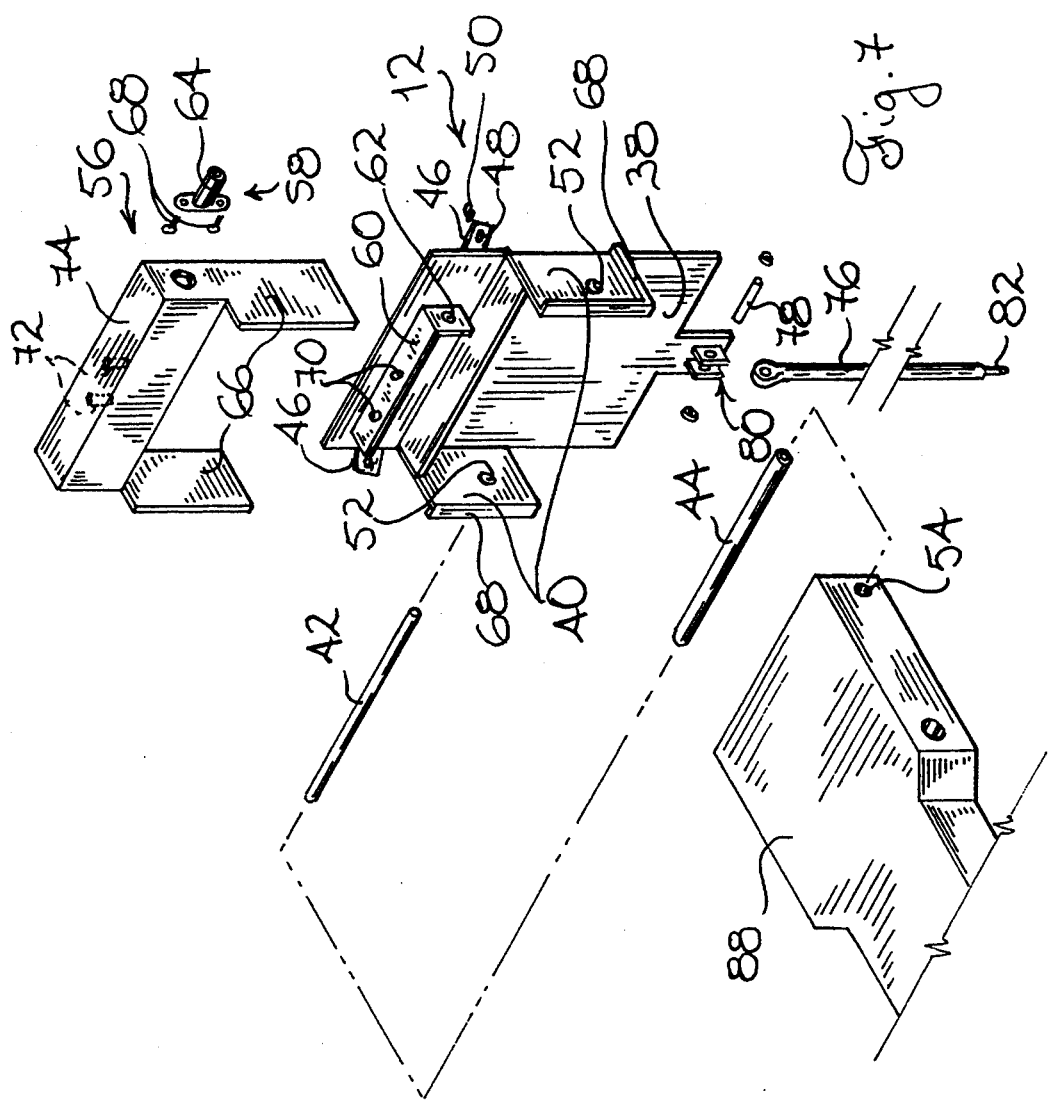

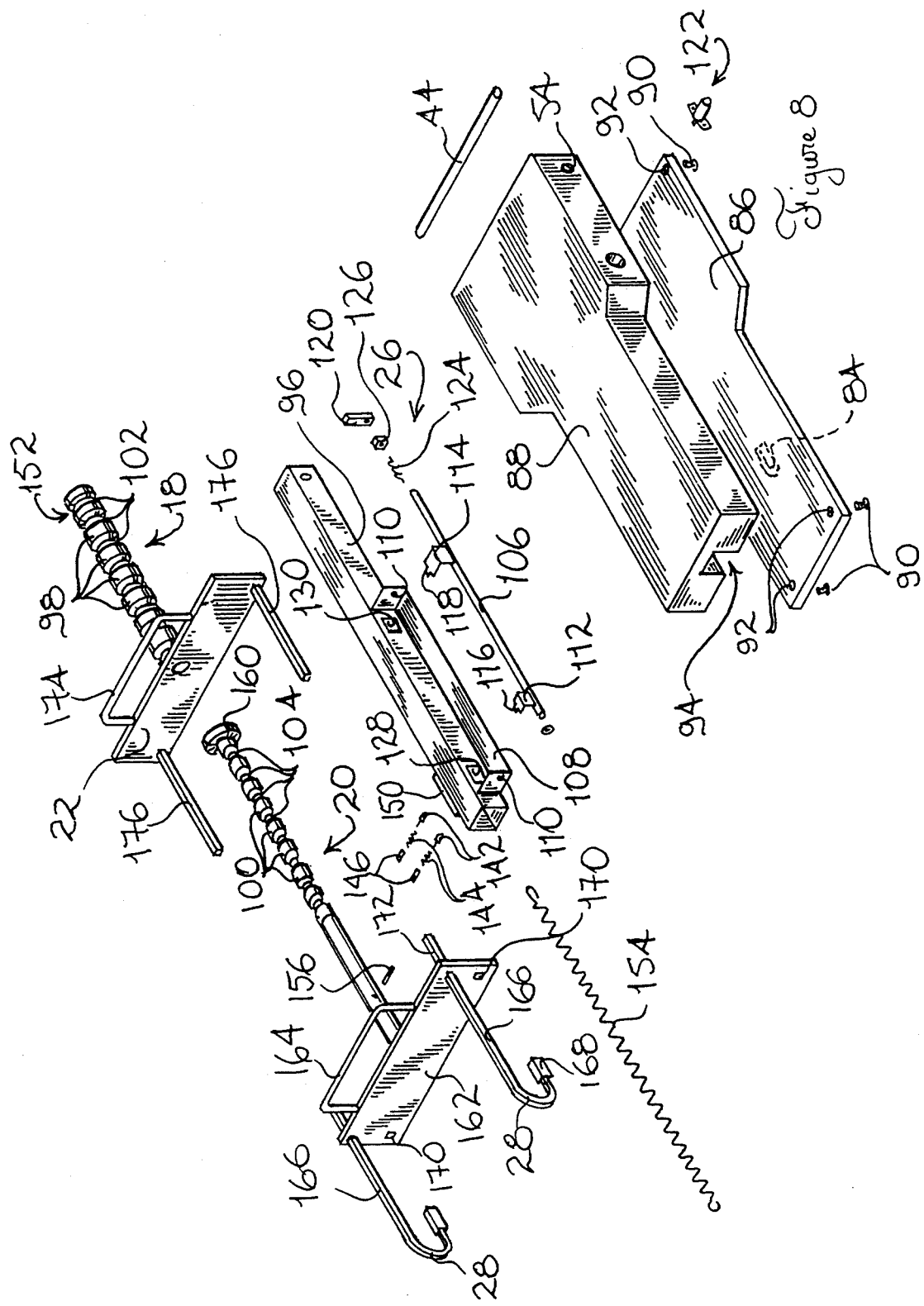

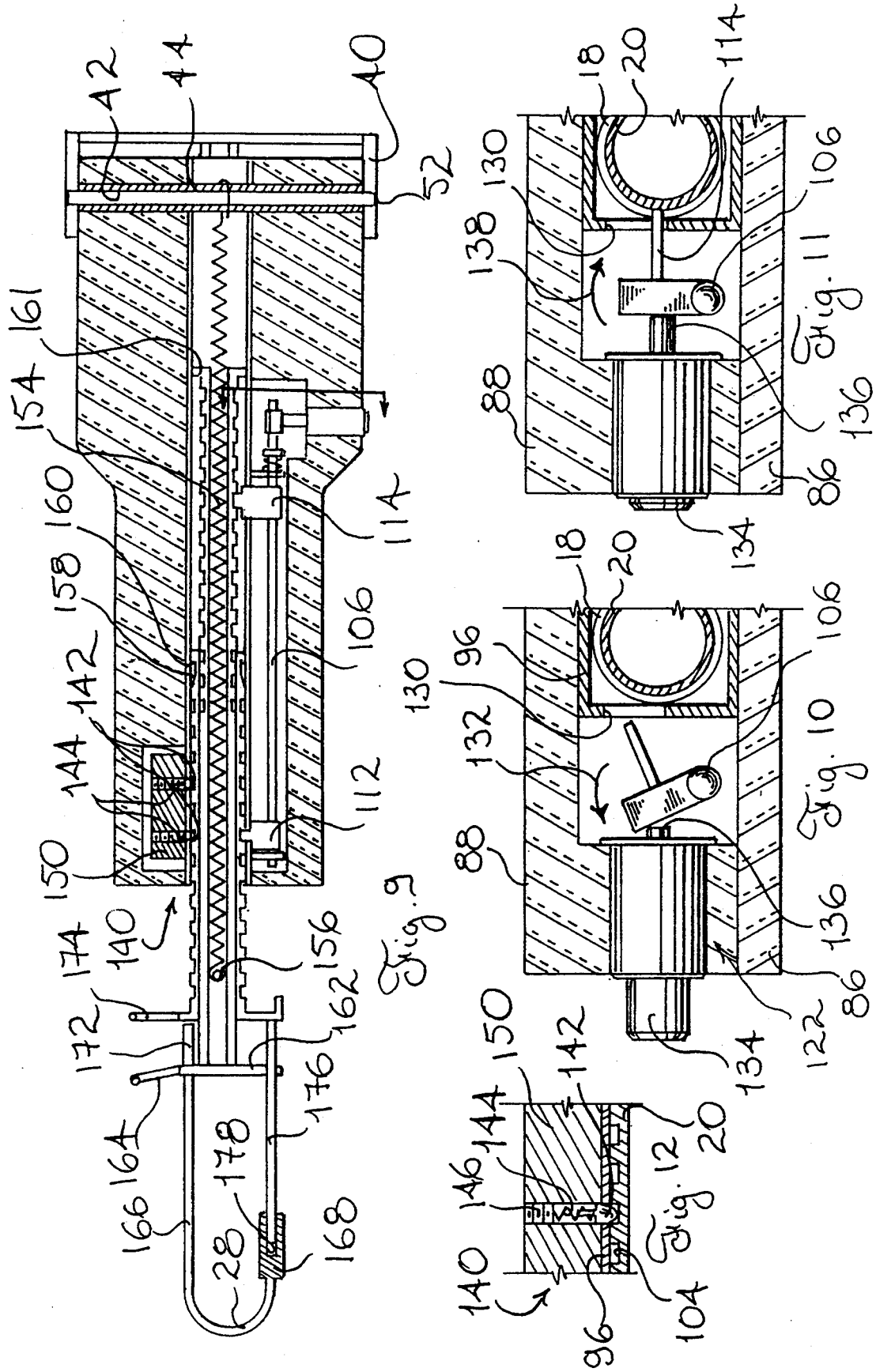

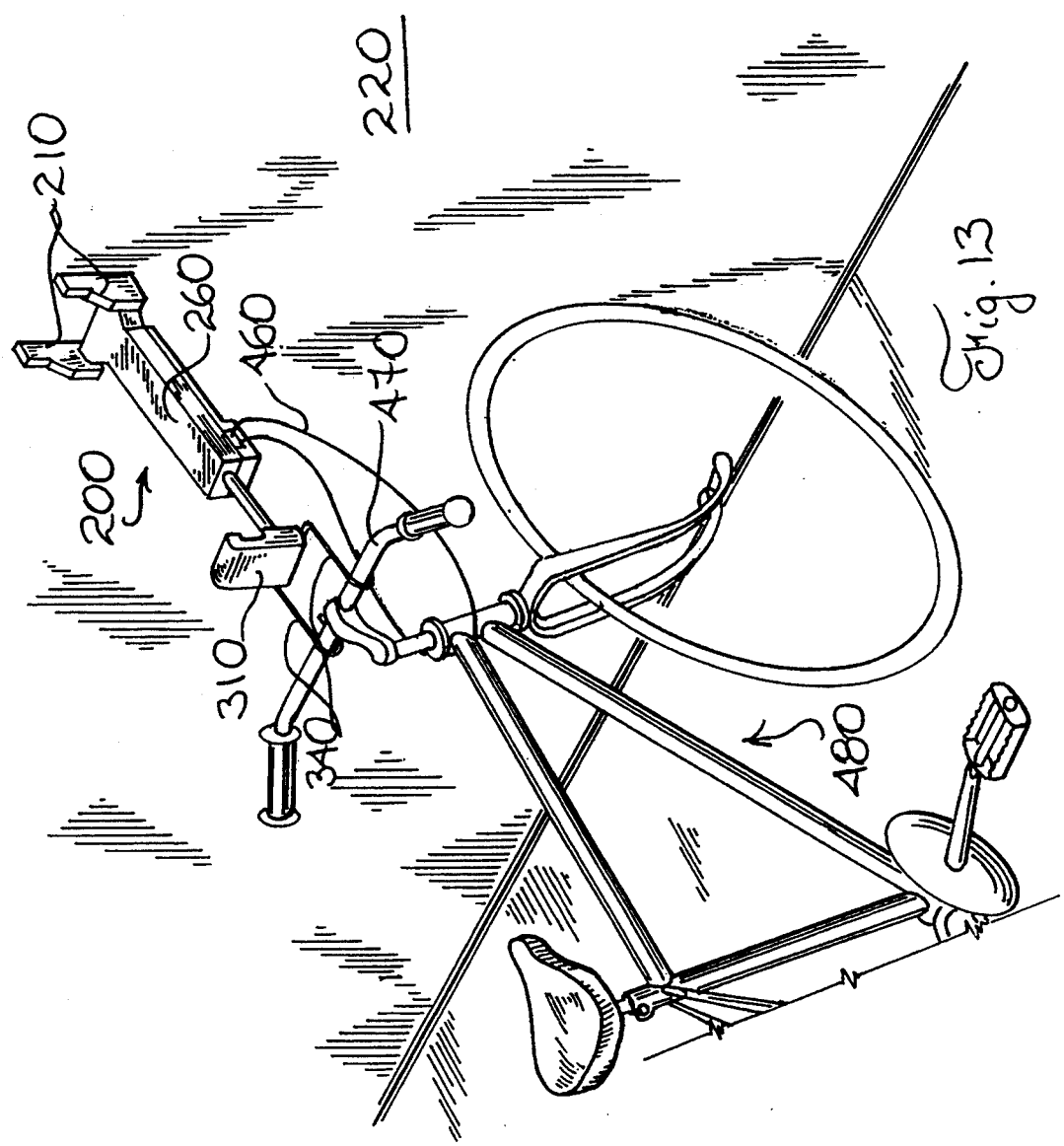

BICYCLE SUPPORTING STRUCTURE

This invention relates to supporting structures and is particularly concerned with structures for supporting bicycles or the like.

BACKGROUND OF THE INVENTION

Most conventional bicycle racks consist of structures resting on the ground and provided with a frame defining at least one interstice for receiving the front wheel of a bicycle. The front wheel of the bicycle once inserted into this interstice is thus abuttingly supported preventing the bicycle from being laterally knocked down.

One of the major disadvantages associated with this type of structure is that they tend to damage the spoke components of the wheel. Indeed, the spokes of the wheel which are attached at one of their ends to the rim and at their other end to the axle protrude laterally from the rim. They are thus called upon to serve as an abutting means for abutting the wheel against the structure defining the interstice into which it is inserted.

Since they are conventionnally made of a piece of relativelly thin wire tensionned between the rim and the axle, the spokes are not particularly well adapted to withstdand flexional stress. Consequently, when called upon to laterally support the weight of the bicycle by abbuting against the structure defining the interstice, they have a tendency to either get warped or to modify part of their tensionnal characteristics.

To circumvent this problem, various attempts have been made to design bicycle racks which support other parts of the bicycle. Some of these racks are specifically adapted to support the frame of the bicycle. However, this type of rack as proven to be quite bulky and relatively expensive to manufacture.

Other racks have been designed to connect with the handlebar section of the bicycle. Examples of such racks are disclosed in U.S. Pat. No. 2,329,088 granted to Charles F. Schram and Frank H. Schram in 1943 and Canadian patent 586,599 granted to George F. Loing in 1959. Some of the disadvantages associated with these racks include the fact that they are not particularly well adapted to accomodate the various shapes and sizes of bicycles now found on the market and are also not adapted to provide for efficient locking action.

SUMMARY OF THE INVENTION

Accordingly, the present invention proposes an improved supporting structure for supporting a bicycle, said structure comprises a base adapted to be secured to a wall surface, a sleeve pivotally connected to said base, a shaft means having a longitudinal axis, said shaft means being slidably engaged in said sleeve and adapted to translate between a retracted position and an extracted position while also being able to rotate about its longitudinal axis, a gripping means fixed to a free end of said shaft means for gripping a part of said bicycle and supporting the latter.

Preferrably, said shaft means is a pair of coaxial shafts comprising a first shaft telescopically inserted into a second shaft, said first shaft being adapted to translate inside said sleeve between a first shaft retracted position and a first shaft extracted position and said second shaft being adapted to translate inside said first shaft between a second shaft retracted position and a second shaft extracted position.

Conveniently, said gripping means is a pair of hooks members.

Preferrably, the supporting structure further comprises a releasable sleeve locking means for locking said sleeve in a substantially horizontal position and a releasable shaft locking means for selectively locking said first shaft relatively to said sleeve and for simultaneously locking said second shaft relative to said first shaft.

In a preferred embodiment, the structure further comprises a second shaft biasing means for biasing said second shaft towards said second shaft retracted position.

Conveniently, the supporting structure further comprises a first shaft plate member fixed to a free end of said first shaft, a second shaft plate member fixed to a free end of said second shaft, a pair of second plate hook members extending from said second shaft plate member, a pair of first plate rod members extending from said first plate members and through said second plate member, said rod members being adapted to be put in abutting relationship with said second plate hook members.

BRIEF DESCRIPTION OF THE DRAWINGS

The present invention will be further understood from the following description with reference to the drawings in which:

FIG. 7, in an exploded view, illustrates the components of the base of the supporting structure of FIG. 1;

FIG. 8, in an exploded view, illustrates the internal components of the supporting structure of FIG. 1;

FIG. 9, in a longitudinal cross sectional view taken along arrows 9—9 of FIG. 1, illustrates the supporting structure of FIG. 1 with its coaxial shafts in a partially retracted position;

FIG. 10, in a detail cross-sectional view illustrates a portion of the locking mechanism in an unlocked position;

FIG. 11, in a detail cross-sectional view illustrates a portion of the locking mechanism in a locked position;

FIG. 12, in a detail cross-sectional view illustrates a portion of an indexing mecanism;

FIG. 13 in a perspective view illustrates a bicycle being supported by a supporting structure in accordance with a second embodiment of the present invention;

Similar references are used in different figures to denote similar components.

DETAILED DESCRIPTION

Figure 1:
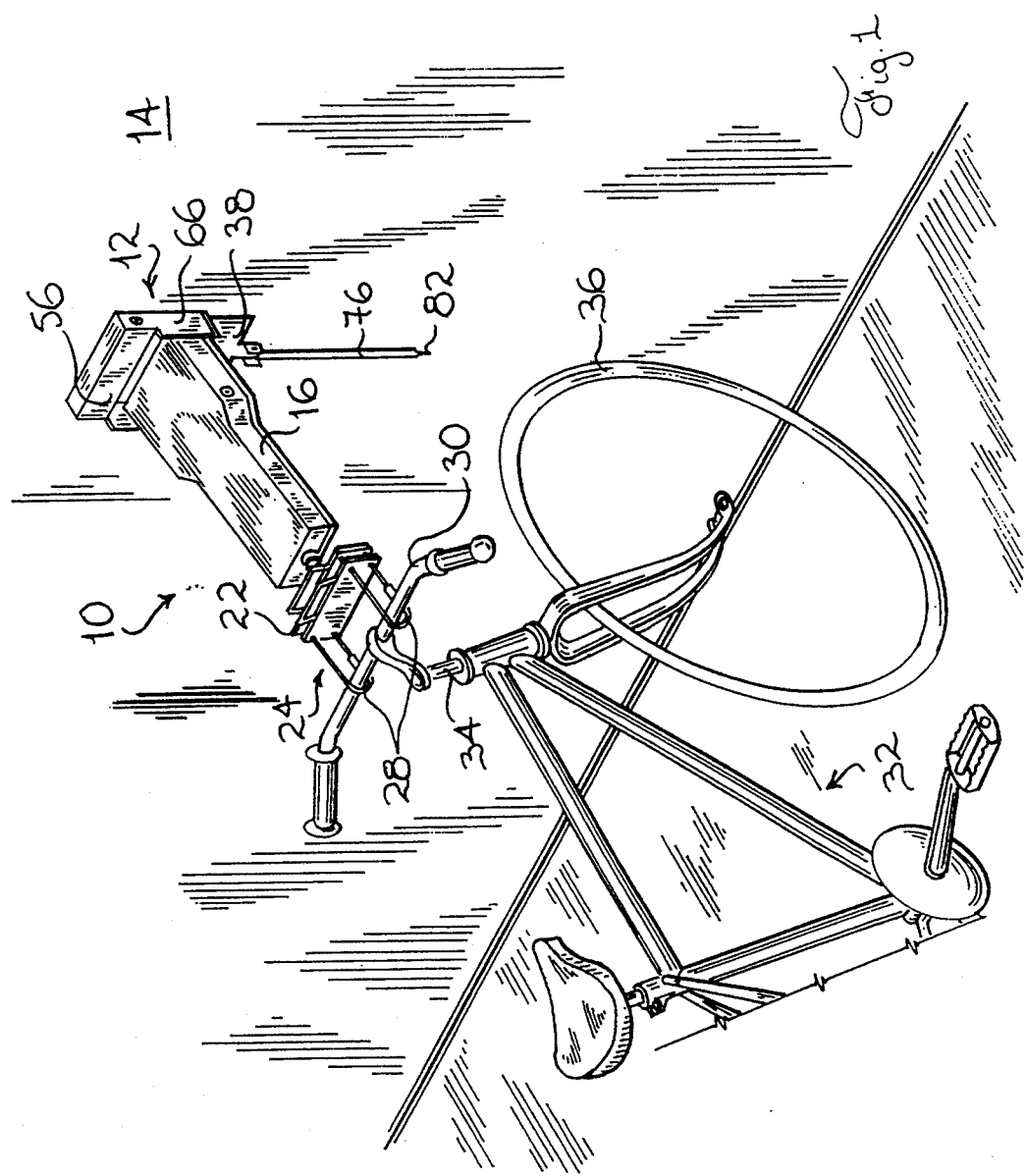
FIG. 1, in a perspective view, illustrates a bicycle being supported by a supporting structure in accordance with a first embodiment of the present invention.

Referring to FIGS. 1, there is illustrated in a perspective view, a supporting structure 10 in accordance with a first embodiment of the present invention.

The supporting structure 10 has a mounting base 12 adapted to be fixed to a substantially vertical surface such as a wall 14. A sleeve 16 is pivotally mounted at one of its end to the mounting base 12. The sleeve 16 is adapted to serve as a guiding means for guiding the translation of a pair of coaxial shafts 18 and 20 respectively having a plate 22 and a gripping means 24 at their external ends. The sleeve 16 also protectively encloses a translation locking mechanism 26 adapted to lock the coaxial shafts 18 and 20 in a predetermined position relative to the sleeve 16.

The gripping means 24 has a pair of substantially U-shaped arms 28 for gripping the handlebars 30 of a bicycle 32 preferably on both sides of the stem 34 and pulling the bicycle 32 towards the wall 14 so that its front wheel 36 abuts against the wall 14.

Referring now more specifically to FIG. 7, the mounting base 12 has a flat plate 38 and a pair of lateral hinge flanges 40 extending integrally and perpendicularely from the plate 38. A pivoting rod 42 and its corresponding friction sleeve 44 extend through a pair of apertures 52 provided in both the flanges 40 and a transversal channel 54 provided in the rear portion of the sleeve 16. The rod 42 allows the sleeve 16 to pivot relative to the base 12.

The plate 38 also has a pair of integral fixing flanges 46. The fixing flanges 46 each have an aperture 48 for receiving a corresponding pair of fastening elements such as bolts 50. The bolts 50 serve to fix the plate 38 to the wall 14.

A protective cover 56 is removably mounted on the mounting base 12 for selectively limiting access to the head of the bolts 50 and thus preventing unwanted removal of the supporting structure 10 from the wall 14.

The cover 56 has a locking mechanism 58 which releasably secures the cover 56 to the mounting base 12 in a position illustrated in FIG. 1 wherein the bolts 50 are innaccesible to a potential thief. The locking mechanism 58 comprises a substantially "L"-shaped locking bar 60 having a locking aperture 62. The locking aperture 62 is adapted to receive a corresponding locking pin part of a push-type lock 64. When the lock 64 is in a locked position, the locking pin extends through the aperture 62, thus preventing unwanted lifting of the cover 56. The locking pin is moved between a retracted and a locking extended position by a conventional locking mechanism using a key or other suitable means. The locking mechanism is fixed to a lateral flange 66 part of the cover 56 by a set of internal scews 68.

When the cover 56 is in the position illustrated in FIG. 1, the flanges 66 are adapted to abut against a lip 68 extending integrally from the hinge flanges 40 which thus act as a first guiding means. A set of guiding apertures 70 extending through the plate 60 are adapted to act as a second guiding means. The guiding apertures 70 are adapted to receive a corresponding set of guiding rods 72 extending downwardly from the inner surface of the top plate 74 of the cover 56, thus aligning the cover 56 with the mounting base 12.

A pivoting supporting bar 76 is pivotally mounted to a lower segment of the plate 38 by a pin 78 extending through an hinge 80. The supporting bar 76 has a relatively pointed end 82 adapted to be releasably inserted inside a corresponding notch 84 provided in a lower wall 86 of the sleeve 16. The supporting bar 76 is adapted to pivot between an inoperative position wherein it lies flat against the vertical surface and an operative position illustrated in FIG. 3 and 6, wherein the pointed end 82 is inserted in the notch 84 for supporting the sleeve 16 in a substantially horizontal position.

Referring now more specifically to FIGS. 8 through 12, the sleeve 16 has a top body 88 and a lower wall 86 releasably fixed to the top body 88 by conventional fastening means such as screws 90 extending through conventional apertures 92. The top body 88 has a channel 94 extending longitudinally therethrough and adapted to receive the internal components of the supporting structure 10.

The channel 94 is adapted to receive a guiding hollow jacket 96. The coaxial shafts 18 and 20 are adapted to translate inside the jacket 96. The longer and diametrically thinner shaft 20 is telescopically inserted inside the shorter and diametrically larger shaft 18. The shaft 18 is thus adapted to slide over the shaft 20.

Both the shaft 18 and the shaft 20 have a segment respectively made of a set of rings 98 and 100 spaced apart by a corresponding set of circumferential interstices 102 and 104.

The longitudinal translational displacement of the shafts 18 and 20 relative to each other and relative to the sleeve 16 is adapted to be locked by the translation locking mechanism 26. The mechanism 26 comprises a locking rod 106 rotatably mounted on a rod supporting structure 108. The rod supporting structure 108 is rigidly fixed to the jacket 96. Typically, the supporting structure 108 is a flat elongated piece of material bended about its extremities. The structure 108 is provided with a pair of apertures 110 adapted to receive the rod 106 for rotatably supporting the latter.

The locking rod 106 is provided with a shorter shaft locking pin 112 and a longer shaft locking pin 114. Both pin 112 and pin 114 are typically made of a bended flat piece of material rigidly fixed to the rod 106 at one of their end and respectivelly having a relatively narrow tip 116 and 118 at their other end.

An abbuting block 120 is fixedly mounted on the rod 106 adjacent one of its end. A push type lock 122 is mounted in the sleeve 16 adjacent the block 120. A biasing means such as a torsion sping 124 is mounted with one of its end fixed to the supporting structure 108 and its other end fidex to a spring fixing ring 126 adapted to rotate jointly with the rod 106.

The jacket 96 is provided with a set of radial apertures 128 and 130 for respectively allowing a portion of the pins 112 and 114 to extend theretrough when the translational locking mechanism is in its locked position illustrated in FIG. 11. In this locked position, the tips 116 and 118 are inserted in a corresponding pair of interstices 104 and 106 thus preventing longitudinal axial translation of the shafts 18 and 20.

As illustrated more specifically in FIGS. 10 and 11, the pins 112 and 114 are moved between their locking and unlocking position by the action of the pushtype lock 122 on the abbuting block 120. In the unlocking position illustrated in FIG. 10, the spring 124 biases the rod 106 and thus the abutting block 120 to which it is attached in a counter clockwise rotational direction indicated by arrow 132. When the key receiving portion 134 of the push type lock 122 is pushed inwardly as illustrated in FIG. 11, the tongue 136 of the push-type lock 122 is correspondingly pushed toward the abutting block 120, thus pivoting the latter clockwise in FIG. 11, as indicated by arrow 138. When the tongue 136 as reached its locked position illustrated in FIG. 11, the tips 116 and 118 of the respective pins 112 and 114 are inserted in a corresponding pair of interstices 102 and 104 thus preventing unwanted longitudinal displacement of the shafts 18 and 20.

To ensure that the pins 112 and 114 are always in register with a corresponding pair of interstices 102 and 104, a ratchet-type of registering mechanism 140 is provided. The registering mechanism 140 is illustrated more specifically in FIGS. 9 and 12. The registering mechanism 140 comprises a pair of registering pins 142 biased towards the shaft 18 by a corresponding pair of coil type springs 144. The tension in the spings 144 is adjusted by means of a corresponding pair of threaded bolts 146. The pins 142, the springs 144 and the bolts 146 are positionned inside a corresponding pair of registering channels extending through a registering block 150 and through the jacket 96. The registering block 150 is fixed to the jacket 96 and is protectively enclosed inside the sleeve 16.

The shaft 18 has a terminal interstice 152 positioned adjacent its inner end. The terminal interstice 152 is deeper then the interstices 104 which are used for locking and indexing purposes. The terminal interstice 152 has a slanted portion 158 and a back wall 160. The back wall 160 is adapted to abuttingly act as a stopping means for preventing the unwanted removal of the shat 18 from the casing 16. The terminal interstice 152 is design in order to work jointly with at least one of the registering pins 142 to releasably catch the latter when the shaft 18 is pulled to its most extracted position.

The shaft 20 is provided with a terminal stopping ring 161 at its inner end. The stopping ring 161 is adapted to abut against the inner end of the shaft 18 when the shaft 20 is pulled to its outer most position. The stopping ring 161 thus prevents the shaft 20 from being pulled out of the casing 16.

The shaft 20 is biased toward a retracted position inside the sleeve 16 by a coil-type spring 154. The spring 154 is attached at one of its end to the friction sleeve 44 and at its other end to a fixing pin 156 extending radially trough the shaft 20.

The gripping means 24 comprises a gripping means plate 162 rigidly fixed to the outer end of the shaft 20. The gripping means plate 162 has a handle 164 extending integrally from one of its edges. A pair of gripping hooks 166 extend trhough the gripping means plate 162 with the "U"-shaped gripping arms 28 on one side and an abutting section 172 on the other side. The gripping hooks 166 each have a rod receiving element 168 extending integrally from the terminal end of their U-shaped portion. The gripping means plate 162 also has a corresponding pair of rod receiving apertures 170 extending therethrough.

Figure 2:
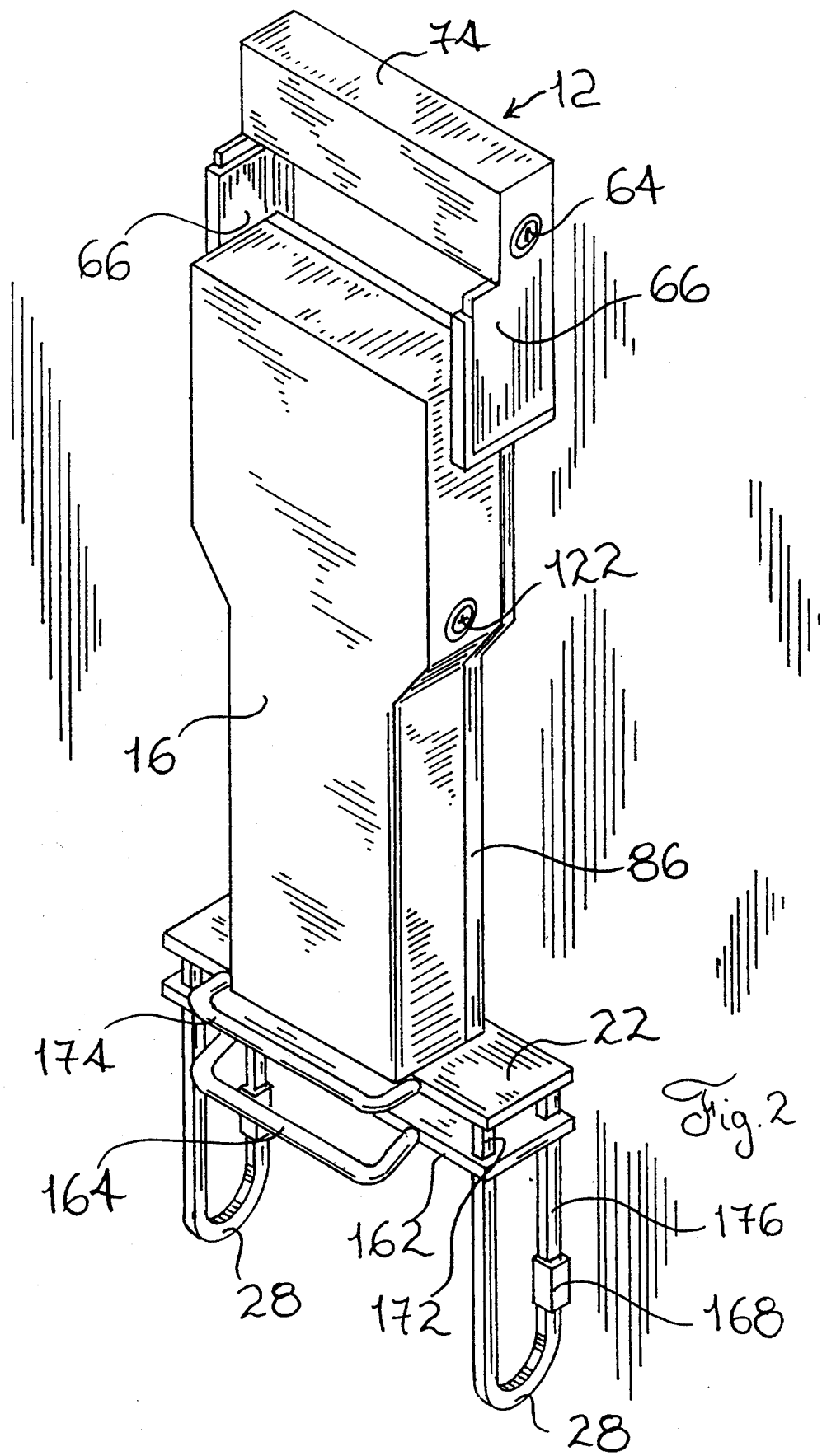
FIG. 2, in a perspective view, illustrates the supporting structure of FIG. 1 in a folded position.

A handle 174 extends integrally from one of the side edges of the plate 22. A pair of locking rods 176 extend perpendicularly from the plate 22. As illustrated more specifically in FIGS. 3, 6 and 9, the locking rods 176 are adapted to be slidably inserted through the rod receiving apertures of the gripping means plate 162 and into a recess 178 provided in the rod receiving elements 168. In use, the sleeve 16 is adapted to pivot between a substantially horizontal position illustrated in FIG. 4 and a substantially vertical position illustrated in FIG. 2 wherein the supporting structure 10 is in a folded inoperative position minimising the occupied space.

In a first method of use illustrated more specifically in FIG. 1, the supporting structure 10 is used to supported and lock the bicycle 32 in a substantially upright position. To use the structure 10, the bicycle 32 is first positionned adjacent the wall 14 with its front wheel 36 abutting against the latter. The sleeve 16 is then pivoted relative to the base 12 to an appropriate angle which allows the gripping means 24 to be placed at a height corresponding to the height of the handlebars 30. The handle 174 is then pulled by the user to bring the gripping means adjacent the handlebars 30.

The user then pulls on the handle 164 thus separating the plates 22 and 162. The pulling action on the handle 164 also creates a spacing indicated by the arrows S—S in FIG. 3. The handlebars 30 are inserted in the spacing S-S and the handle 164 is pushed back so that the handlebars 164 become trapped as illustrated in FIG. 1. The user then merely needs to lock the locking mechanism 26 to prevent unwanted relative movement of the shafts 18 and 20 which would create the spacing S—S and allow removal of the handlebars 30 from the supporting structure 10.

The supporting structure 10 thus allows for angular adjustment by a piving action between the sleeve 16 and the base 12 and for distance adjustment between the gripping means 24 and the base 12 in order to accomodate bicycles of various sizes and shapes.

Although FIG. 1 illustrates the supporting structure 10 secured to the handlebars, it is easaly conceivable that any other suitable component of the bicycle could be used without departing fom the spirit of the invention.

Figure 4:
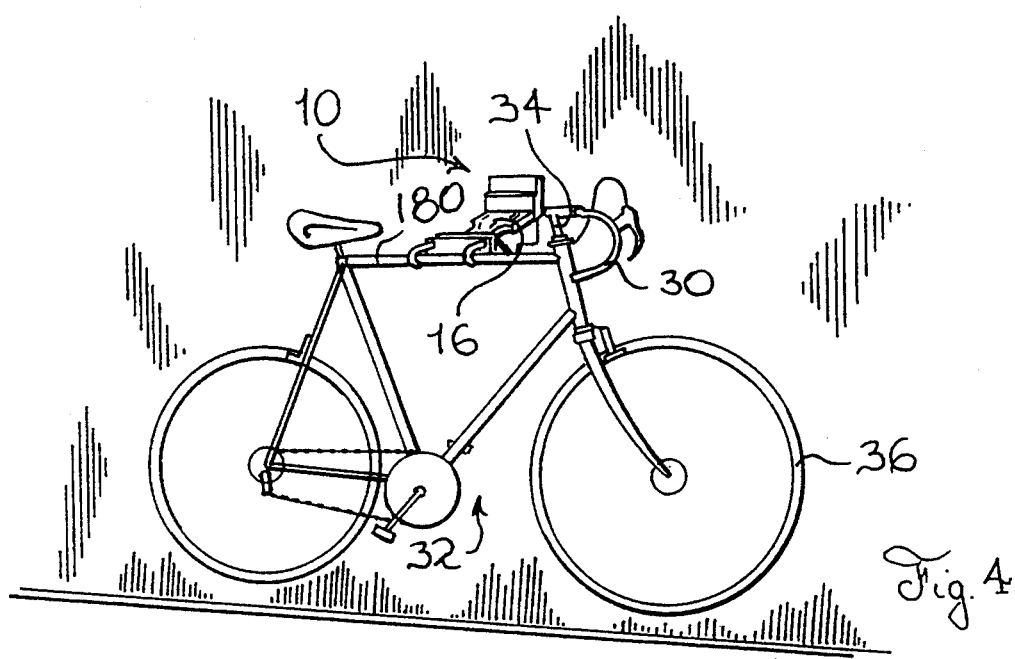
FIG. 4, perspective view, illustrates the supporting structure of FIG. 1 suspending a bicycle by its crossbar.
Figure 5:
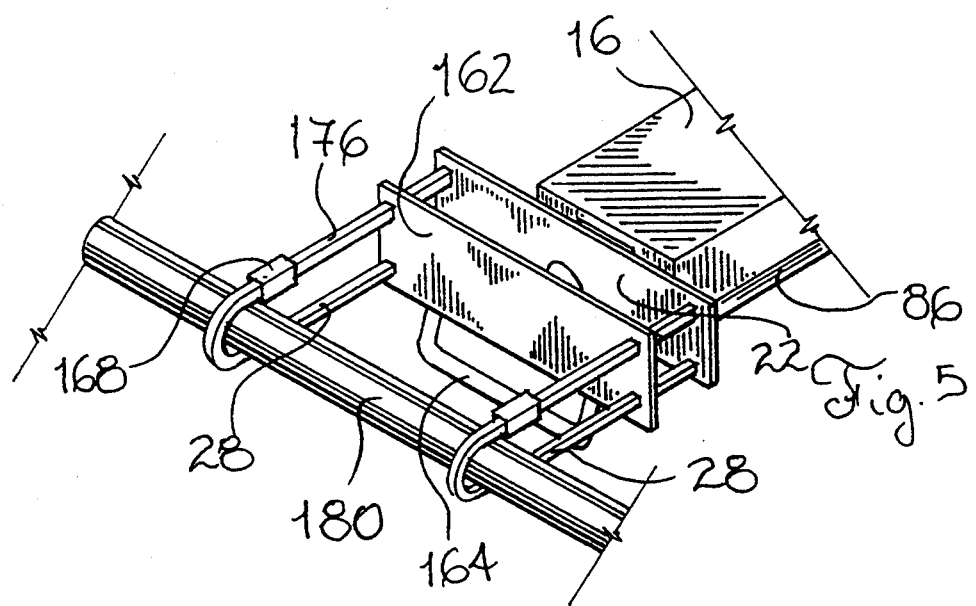
FIG. 5, in a detail view of FIG. 4, illustrates the relationship between the cross-bar of the bicycle and the grasping component.

In a second method of use illustrated in FIGS. 4 and 5, the supporting structure 10 is used to suspend the bicycle 32 in a substantially upright position with its wheels of the ground and its frame substantially parallel to the wall 14, thus providing an ergonomical position for various operations such as a potential reparing operation.

To use the supporting structure 10 in this second method of use, the sleeve 16 is first pivoted to a substantially horizontal position and the pointed end 82 of the supporting bar 76 is inserted in the notch 84,thus releasably securing the sleeve in this position.

Figure 3:
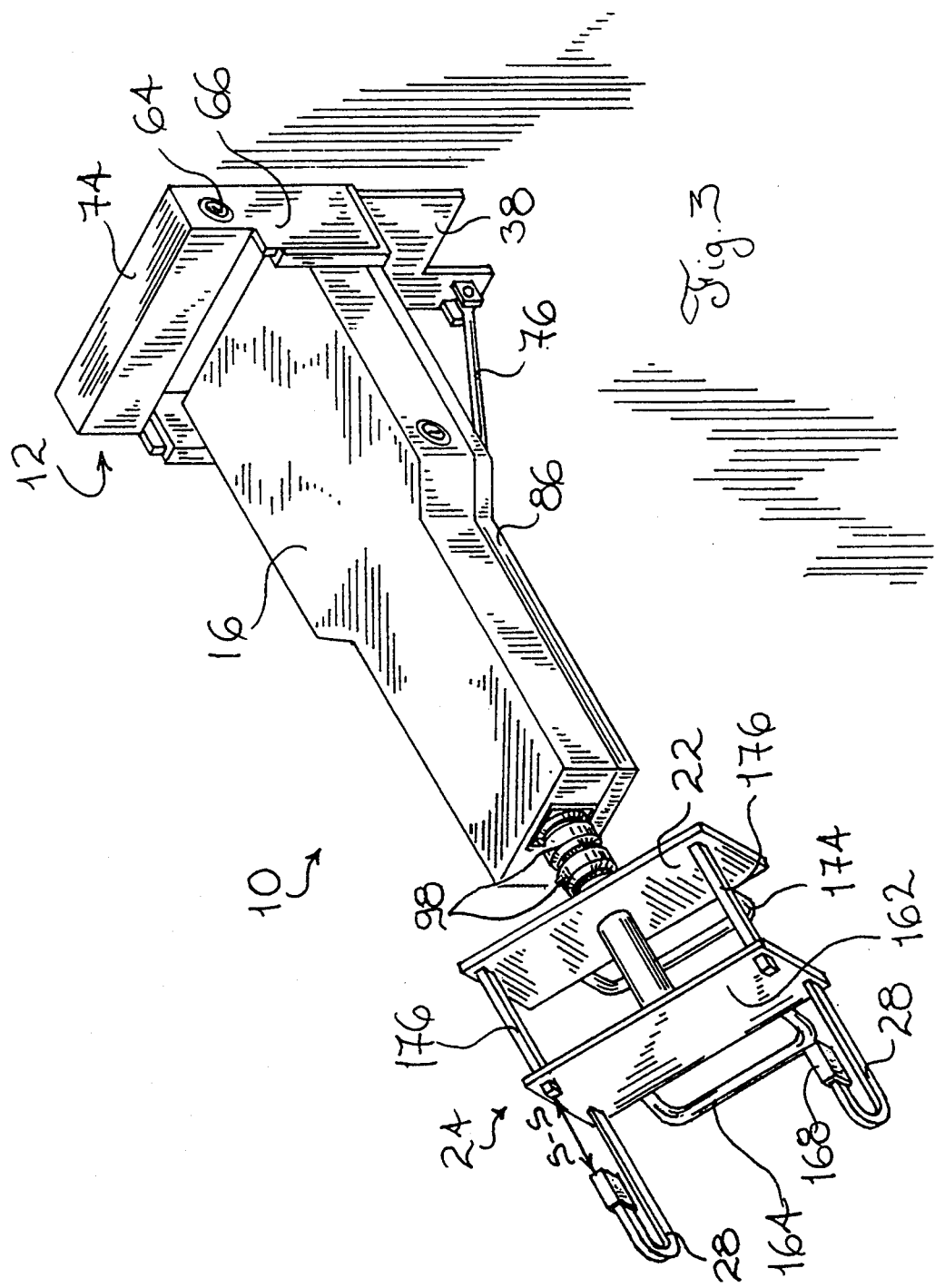
FIG. 3, in a perspective view, illustrates the supporting structure of FIG. 1 with its grasping component partially opened and its shafts being axially pivoted about their longitudinal axis.

As illustrated in FIG. 3, the shafts 18 and 20 are adapted to be rotated about their longitudinal axis. The use of interstices 102 and 104 having a circular configuration allows for this rotational action even with the locking mechanism 26 in a locked position. To use the supporting structure 10 in this second method of use, the user merely needs to rotate the shaft 18 and 20 180 degrees in either direction about their longitudinal axis. The rotation is performed by grasping either one of the handles 164 or 174. Once the shafts 18 and 20 have been pivoted, the handles 164 and 174 are facing the ground. FIG. 3 illustrate the shaft 18 and 20 in an intermediate position almost completly rotated. Once the rotation is completed, the handle 164 is pulled, thus creating the spacing S—S. With the shafts 18 and 20 in a fully rotated positon, the segment of the gripping hooks between the "U"-shaped portion and the plate 162 provides for a resting structure on which the transversal bar 180 of the bicycle 32 can be rested. Once the transversal bar 180 has been inserted in the spacing S—S, the handle 164 is pushed back and the locking mechanism 58 is again used to prevent unwanted withdrawal of the bicycle 32.

Figure 6:
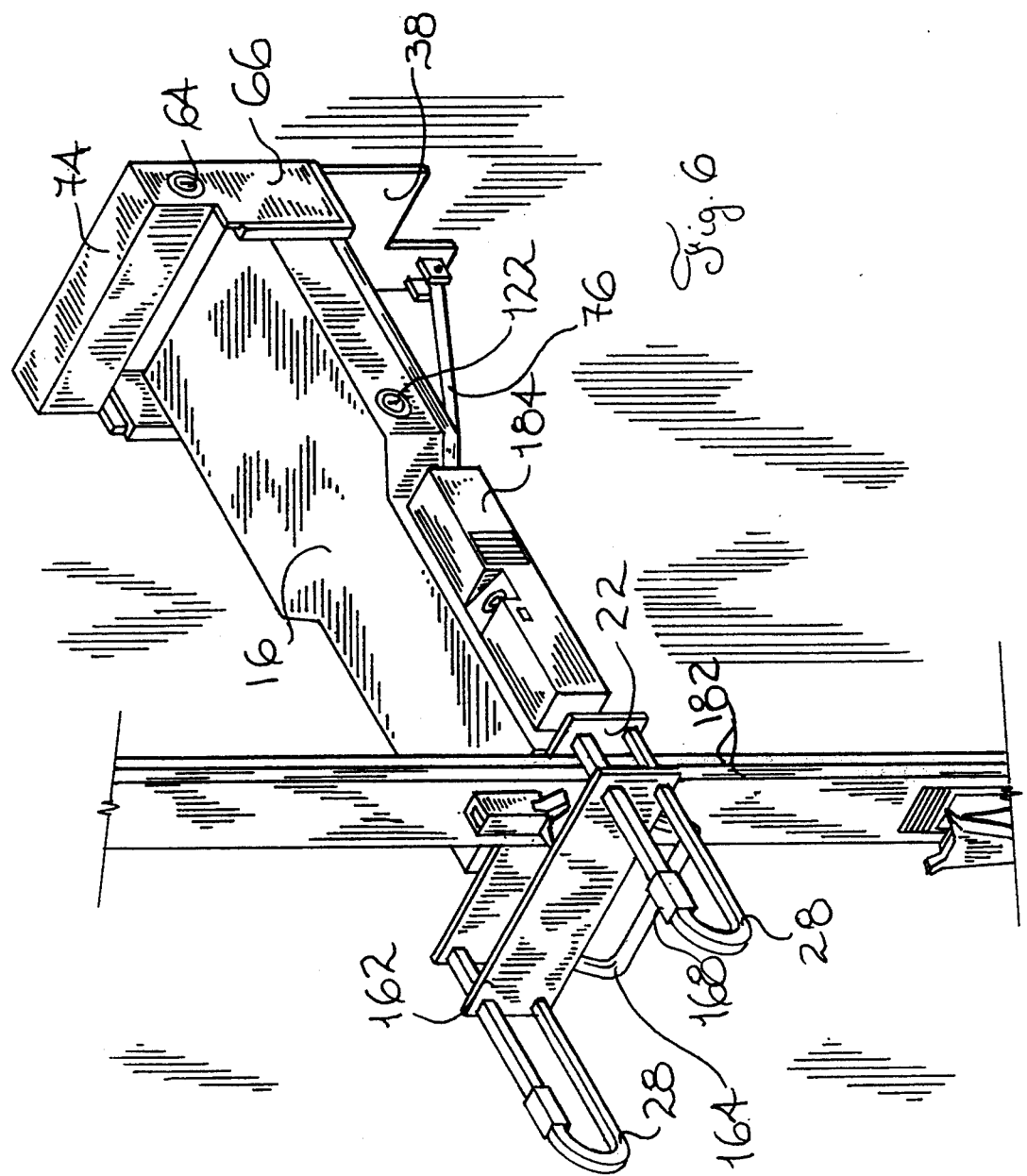
FIG. 6, in a perspective view, illustrates the supporting structure of FIG. 1 supporting two pairs of skis.

The supporting structure 10 is adapted to be used in a third method of use illustrated in FIG. 6. In this method, various types of articles such as a pair of skis 182 are inserted between the plates 22 and 162 before the shafts 18 and 20 are locked thus preventing unwanted removal of the articles trapped between the two plates.

As illustrated in FIG. 6, an alarm system 184 responsive to vibration or shock can be mounted on the sleeve 16 to further discourage potential theft of any article loked by the supporting structure 10.

Figure 14:
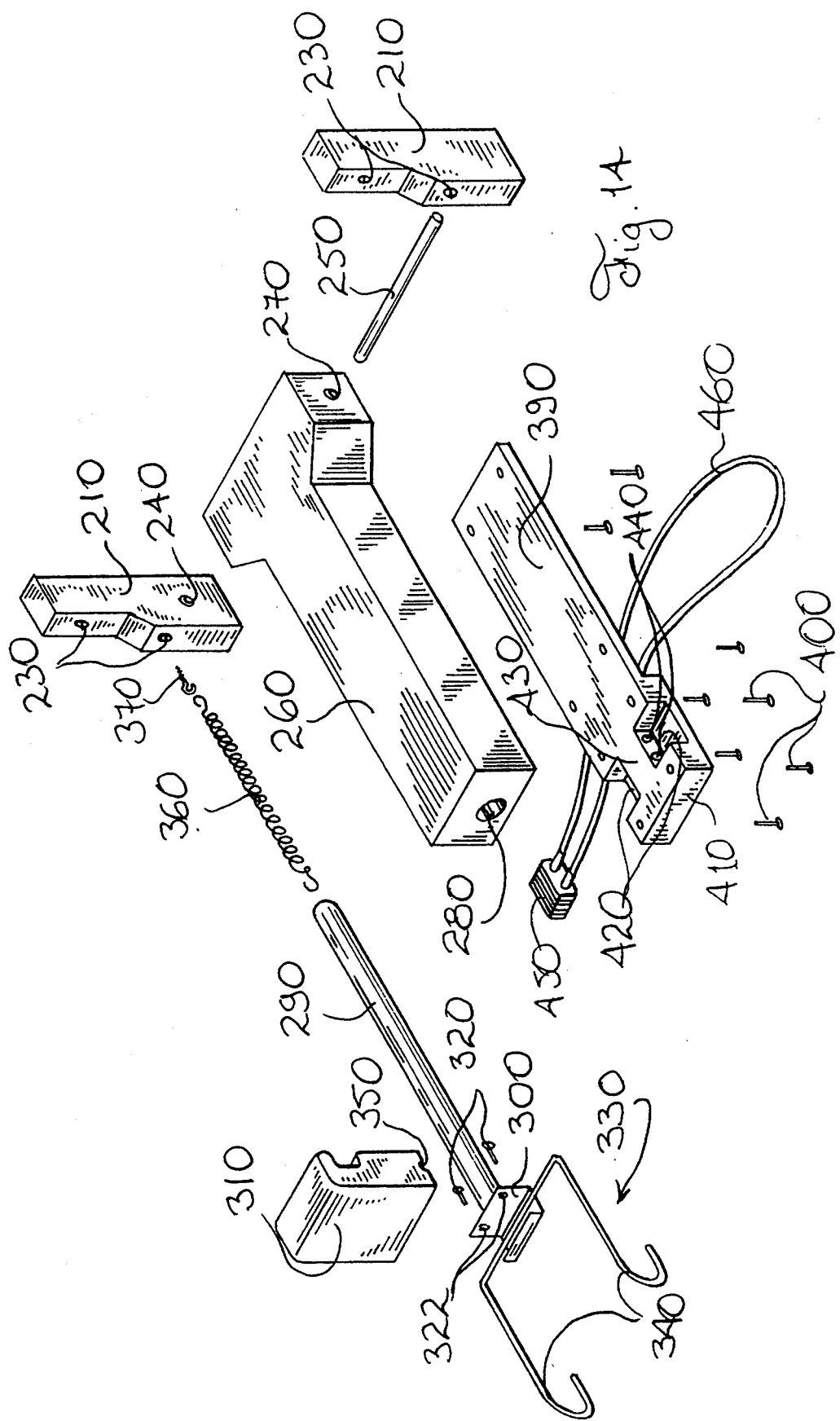
FIG. 14, in an exploded view illustrates the components of the second embodiment of FIG. 13.
Figure 15:
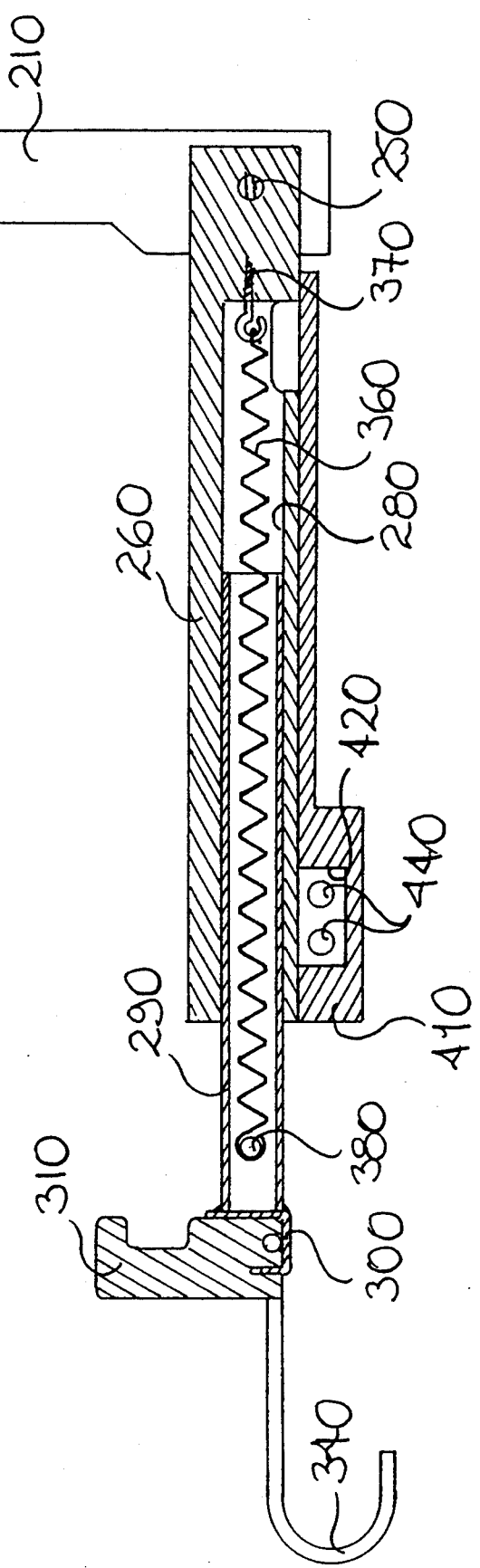
FIG. 15, in a longitudinal view taken along arrows 15—15 of FIG. 13, illustrates the second embodiment of the supporting structure with its shaft in a partially retracted position.

Referring now more specifically to FIGS. 13 to 15, there is illustrated a supporting structure 200 in accordance with an alternative embodiment of the invention.

The supporting structure 200 has a pair of base blocks 210 adapted to be fixed to a vertical surface such as a wall 220 by conventional fastening means such as bolts 230. The base blocks 210 each have an aperture 240 for receiving a transversal pivoting rod 250. A sleeve 260 is pivotally mounted between the base blocks 210 on the pivoting rod 250 for pivotal action between a substantially vertical position and an operative position illustrated in FIG. 13. The sleeve 260 as a transversal bore 270 positionned adjacent its rear end and extending therethrough for pivotally receiving the pivoting rod 250. The sleeve 260 also has a longitudinal channel 280 extending from its frontal end and adapted to receive a hollow shaft 290. The shaft 290 has a substantially "L"-shaped fixing element 300 rigidly attached to its front end. The fixing element 300 is adapted to receive a handle 310. The handle 310 is fixed to the fixing element by a set of scews 320 extending through a corresponding set of apertures 322 provided in the fixing element 300. A gripping element 330 having a pair of substantially hook shaped arms 340 are frictionnaly sqeezed between a notch 350 in the handle 310 and the fixing element 300. A biasing means such as a coil spring 360 is attached at one of its end to the sleeve 260 by a fastening means such as a hook screw 370 and at its other end to the shaft 290 by a transversal attaching pin 380. The coil spring 360 is adapted to bias the shaft towards its retracted position inside the sleeve 260. A base plate 390 is fixed to the sleeve 260 by a set of fasteners 400. The base plate 390 has a thicker portion 410 provided with a pair of recess 420 seperated by a partition wall 430. The partition wall 430 has a pair of lock apertures 440 extending therethrough. The recess 420 are adapted to protectively receive the casing of a lock such as a conventionnal bicycle lock 450 having an elongated locking cable 460.

In use, the sleeve 260 is pivoted from its inoperative position resting on the wall 220 to a position substantially level with the handlebars 470 of the bicycle 480. The handle 310 is then pulled so that the gripping elements 330 grip the handlebars 470 of the bicycle 480 with the spring 360 pulling the latter towards the wall 220. The lock 450 can then be wrapped around a potion of the frame with the cable 460 extending through the apertures 440 thus preventing unwanted removal.

Numerous modifications, variations and adaptations may be made to the particular embodiments of the invention described above without departing from the scope of the invention, which is defined in the claims.

In the claims:

1. A supporting structure for supporting a bicycle, said structure comprising: a base adapted to be secured to a wall surface, a sleeve pivotally connected to said base, a shaft means having a longitudinal axis, said shaft means being slidably engaged in said sleeve and adapted to translate between a retracted position and an extracted position while also being able to rotate about its longitudinal axis, a gripping means fixed to a free end of said shaft means for gripping a part of said bicycle and supporting the latter and wherein said shaft means is a pair of coaxial shafts comprising a first shaft telescopically inserted into a second shaft, said first shaft being adapted to translate inside said sleeve between a first shaft retracted position and a first shaft extracted position and said second shaft being adapted to translate inside said sleeve between a second shaft retracted position and a second shaft extracted position.

2. A supporting structure as recited in claim 1 wherein said gripping means is a pair of hook members.

3. A supporting structure as recited in claim 1 wherein said wall surface is substantially vertical and wherein said supporting structure further comprises a releasable sleeve locking means for locking said sleeve in a substantially perpendicular relationship relatively to said wall position.

4. A supporting structure as recited in claim 1 wherein said structure further comprises a releasable shaft locking means for selectively locking said first shaft relative to said sleeve and for simultaneously locking said second shaft relative to said first shaft.

5. A supporting structure as recited in claim 1, wherein said structure further comprises a second shaft biasing means for biasing said second shaft towards said second shaft retracted position.

6. A supporting structure as recited in claim 1, wherein said supporting structure further comprises a first shaft plate member fixed to a free end of said first shaft, a second shaft plate member fixed to a free end of said second shaft, a pair of first plate hook members extending from said first shaft plate member, a pair of second plate rod members extending from said second plate member and through said first plate member, said rod members being adapted to be put in abutting relationship with said first plate hook members.

7. A supporting structure as recited in claim 1 wherein said shaft means is a shaft telescopically inserted in said sleeve.

* * * * *